United States Patent
Tokumaru et al.

(10) Patent No.: US 7,662,356 B2
(45) Date of Patent: Feb. 16, 2010

(54) METHOD OF REFINING SI

(75) Inventors: Shinji Tokumaru, Futtsu (JP); Kensuke Okazawa, Futtsu (JP); Jirou Kondou, Futtsu (JP); Masaki Okajima, Tokyo (JP)

(73) Assignee: Nippon Steel Materials Co., Ltd., Tokyo (JP)

( * ) Notice: Subject to any disclaimer, the term of this patent is extended or adjusted under 35 U.S.C. 154(b) by 178 days.

(21) Appl. No.: 11/883,280

(22) PCT Filed: Feb. 9, 2006

(86) PCT No.: PCT/JP2006/302674

§ 371 (c)(1),
(2), (4) Date: Jul. 27, 2007

(87) PCT Pub. No.: WO2006/085679

PCT Pub. Date: Aug. 17, 2006

(65) Prior Publication Data
US 2008/0145294 A1  Jun. 19, 2008

(30) Foreign Application Priority Data
Feb. 9, 2005  (JP) ............................. 2005-032822

(51) Int. Cl.
*C01B 33/02* (2006.01)
*C01B 33/07* (2006.01)
(52) U.S. Cl. .................. 423/349; 423/348; 423/350
(58) Field of Classification Search .................. 423/348, 423/349, 350
See application file for complete search history.

(56) References Cited

U.S. PATENT DOCUMENTS

2005/0139148 A1 * 6/2005 Fujiwara et al. ............... 117/13

FOREIGN PATENT DOCUMENTS

| GB | 2 116 956 A | 10/1983 |
|---|---|---|
| JP | 58-130114 A | 8/1983 |
| JP | 9-202611 A | 8/1995 |
| JP | 09-202611 A | 8/1997 |
| JP | 2003-238139 A | 8/2003 |
| JP | 2004-262746 A | 9/2004 |
| WO | WO 03066523 A1 * | 8/2003 |

OTHER PUBLICATIONS

Suzuki et al, "Thermodynamics for Removal of Boron from Metallurgical Silicon by Flux Treatment," J. Japan Inst. Metals, vol. 54, No. 2, (1990), pp. 168-172 (w/ English language Abstract).

* cited by examiner

*Primary Examiner*—Timothy C Vanoy
*Assistant Examiner*—Serena L Hanor
(74) *Attorney, Agent, or Firm*—Kenyon & Kenyon LLP

(57) ABSTRACT

The present invention provides a method of refining low purity Si by a slag, in particular removing B, which suppresses wear of the reaction vessel due to the slag and produces high purity Si used for solar battery materials etc. at a low cost, comprising adding $SiO_2$ and an alkali oxide or alkali carbonate as a slag material into molten Si to form a slag during which adding one or more types of materials among materials the same as the reaction vessel material used or ingredients included in the reaction vessel material into the slag so as to remove the impurities in the molten Si.

8 Claims, No Drawings

METHOD OF REFINING SI

TECHNICAL FIELD

The present invention relates to a method of refining Si for refining low purity Si by slag, in particular removing B, to produce high purity Si used for a solar battery material etc.

BACKGROUND ART

To remove B from Si, as described in Suzuki et al., *Journal of the Japan Institute of Metals*, vol. 54, no. 2, p. 168 to 172 (1990), there is the method of bringing molten Si into contact with $CaO$—$MgO$—$SiO_2$, $CaO$—$BaO$—$SiO_2$, $CaO$—$CaF_2$—$SiO_2$, or other slag to make the B move to the slag by the equilibrium distribution of B between the slag and molten Si.

Further, Japanese Patent Publication (A) No. 8-11208 discloses a method of refining Si comprising treating molten Si by slag so as to remove impurities from the molten Si, which method adds said slag to molten Si continuously or substantially continuously and, at the time when the slag and molten Si are in an equilibrium state for one or more types of impurity elements, deactivates said slag continuously or substantially continuously or removes it from the molten Si.

DISCLOSURE OF THE INVENTION

The above-mentioned Suzuki et al., *Journal of the Japan Institute of Metals*, vol. 54, no. 2, p. 168 to 172 (1990) or Japanese Patent Publication (A) No. 8-11208 disclose a method of removing B by said slag by utilizing the movement of B from the molten Si to the slag in accordance with the coefficient of distribution of B. In said slag, the coefficient of distribution is a low one of 2.0 at the highest, so to reduce the concentration of B to the 0.3 ppm or less required as a solar battery use Si material from low purity Si having a concentration of B of several to several tens of ppm (so called "metal Si"), it is necessary to use a massive amount of slag. Further, the material of the slag contains 1 to several ppm of B. With a coefficient of distribution of 2.0 or less, in principle it is difficult to reduce the concentration to 0.3 ppm or less.

The inventors engaged in intensive studies and discovered that it is possible to sufficiently remove B by the method of using $SiO_2$ and an alkali oxide or alkali carbonate as a slag material and adding it into molten Si so as to form a slag, and removing the B from the low purity Si by slag refining or the method of adding said slag to maintain that state, then discharging the slag and adding new slag or repeating said process.

However, with the above method of slag refining, if using C or SiC as the reaction vessel, corrosion proceeds due to the reaction with the slag material, that is, the alkali oxide or alkali carbonate, or the $CO_2$ gas formed in the process of forming the slag, so the frequency of replacement of the reaction vessel becomes extremely high and the cost ends up high. On the other hand, when using an oxide-based ceramic as a reaction vessel, compared with C or SiC, the corrosion rate is low, but since the slag is high in basicity, the reaction vessel material gradually dissolves in the slag. If repeatedly adding and discharging slag in long term use, the amount of wear can no longer be ignored.

The present invention was made in consideration of the above circumstance and has as its object the provision of a method of slag refining removing B from low purity Si without causing wear to the reaction vessel even in the method of repeatedly adding and discharging slag with a high basicity as explained above.

The inventors engaged in in-depth research to solve the above problem and as a result attained the object by the following means.

A first aspect of the invention is a method of refining Si using $SiO_2$ and an alkali oxide or alkali carbonate as a slag material and adding it into molten Si in a reaction vessel so as to form slag and move impurities in said molten Si to the slag, said method of refining Si characterized by adding at least one type of ingredient included in the reaction vessel used into said slag.

A second aspect of the invention provides a method of refining Si comprised of the first aspect of the invention further adding an ingredient the same as an ingredient included in said reaction vessel into said slag.

A third aspect of the invention provides a method of refining Si comprised of the first aspect of the invention or second aspect of the invention wherein the ingredient of said reaction vessel is at least one type of ingredient selected from $Al_2O_3$, $MgO$, $CaO$, and $ZrO_2$.

A fourth aspect of the invention provides a method of refining Si comprised of any of the first to third aspects of the invention wherein the ingredient added into said slag is a silicate including at least $SiO_2$ in an amount of 5 mass %.

A fifth aspect of the invention provides a method of refining Si comprised of any of the first to fourth aspects of the invention wherein the amount of the ingredient added to said slag is 0.1 to 20 mass % with respect to the slag material.

A sixth aspect of the invention provides a method of refining Si comprised of any of the first to fourth aspects of the invention wherein the ingredient added to said slag is shaped as granules or fibers.

A seventh aspect of the invention provides a method of refining Si comprised of the sixth aspect of the invention wherein said granular ingredient has a particle size of 0.01 to 10 mm.

An eighth aspect of the invention provides a method of refining Si comprised of the sixth aspect of the invention wherein said fiber ingredient has a diameter of 0.01 to 10 mm and a fiber length of 10 to 500 mm.

In the method of refining low purity Si by slag, in particular to remove B, of the present invention, it is possible to suppress wear of the reaction vessel and provide high purity Si at a low cost.

BEST MODE FOR CARRYING OUT THE INVENTION

The present invention provides a method of adding a material having $SiO_2$ as its main ingredient and a solid having one or more of an Li, Na, or K alkali oxide or alkali carbonate into the molten Si in the reaction vessel so as to form a slag and move the impurities in the molten Si to the slag for removal, which method comprises adding to the slag one or more types of materials among ingredients the same as the reaction vessel material or included in the reaction vessel material to the slag and dissolving the ingredients of the reaction vessel in advance in the slag so as to lower the dissolution rate of the reaction vessel and suppress wear.

The ratio of the $SiO_2$ and the alkali oxide or alkali carbonate added is preferably a molar ratio of the alkali element in the alkali oxide or alkali carbonate with respect to the Si element in $SiO_2$ of 0.05 to 20, more preferably 0.2 to 4. To efficiently remove B from the Si, it is necessary to repeat a plurality of times the process of discharging the slag formed by charging this ratio of slag material and again charging the slag material. The method increasing the amount of the slag material charged for the mass of the Si each time and reducing the number of times of discharge of the slag probably would result in a higher productivity, but if the amount charged per time is too great, the temperature in the reaction vessel falls and time is taken until the slag material becomes a slag and the molten Si is cooled, part becomes solid, and solidified Si ends up being discharged along with the slag at the time of discharge of slag, so it is preferable to determine the optimum amount in consideration of the heat balance in the furnace used.

The reaction vessel has to be selected as a material relatively inexpensive and difficult to corrode by slag and further a material which is more stable as an oxide than Si and difficult to dissolve in molten Si. Inclusion of one or more types of ingredients among $Al_2O_3$, MgO, CaO, and $ZrO_2$ is suitable, but the invention is not limited to this.

Further, the ingredient added in the slag is more preferably a silicate including $SiO_2$ for dissolution in the slag in a short time.

For example, when using an $Al_2O_3$—MgO-based reaction vessel, sometimes a silicate of a ratio of formulation the same as the material of the reaction vessel, one changed in only $Al_2O_3$, only MgO, or in ratio of $Al_2O_3$ and MgO, or one further including $SiO_2$ is added. If a silicate including $SiO_2$ in an amount of 5 mass % or more is used, the time for dissolution in the slag becomes shorter, so this is effective against corrosion of the reaction vessel. These materials are simultaneously added with the material of the slag and added after the discharge of slag and before charging new slag. The mass is preferably 0.1 to 20 mass % with respect to the slag material. If the amount of addition is less than 0.1 mass %, a sufficient effect is not exhibited with respect to the corrosion of the reaction vessel, while if the amount of addition is over 20 mass %, the amount becomes greater than the amount of dissolution of the ingredients of the reaction vessel in the slag in the case of not adding anything. Not only is the amount wasted, but also the viscosity of the slag ends up increasing and discharge of the slag ends up becoming difficult. The present invention has as its object in particular the removal of B from the molten Si, so attention must be given to the concentration of B included in these materials, but if in the above range of addition, there is no particular problem if the concentration of B in the additive is 10 ppm or less. Further, the shape of the material added preferably is granular or fibrous and has a grain size or diameter of 0.01 to 10 mm. If less than 0.01 mm, the material ends up floating and may not be added in the slag. If larger than 10 mm, the time until dissolution into the slag becomes long and the corrosion of the reaction vessel is liable not to be suppressed.

EXAMPLES

Example 1 and Comparative Example 1

An experiment using an $Al_2O_3$ reaction vessel having an inside diameter of 250 mm and a thickness of 50 mm to perform an operation of melting 30 kg of metal Si having a B concentration of 8 ppm, then raising it in temperature to 1550° C., charging 5 kg of $SiO_2$ and 10 kg of $Na_2CO_3$ as the slag material, then discharging the result after 10 minutes 20 times was run for the case of not adding anything except for the slag material (comparative method) and the case of adding 200 g of $Al_2O_3$ containing 30 mass % $SiO_2$ having an average particle size of 1 mm each time at the same time as charging the slag material (method of the present invention). The results are shown in Table 1. When not adding anything other than the slag material, the wear at the inside wall of the reaction vessel near the interface of the slag and molten Si becomes the worst. Compared with a maximum 10 mm reduction in thickness, when adding 200 g of $Al_2O_3$-30 mass % $SiO_2$ particles, this was reduced to 1 mm. Further, the concentrations of B in the molten Si after refining were 0.1 ppm or less in both cases.

TABLE 1

|  | Maximum wear depth (mm) | B concentration (ppm) |
|---|---|---|
| Comparative example method | 10 | <0.1 |
| Invention example method | 1 | <0.1 |

Example 2 and Comparative Example 2

An experiment using a MgO reaction vessel containing 3 mass % CaO having an inside diameter of 250 mm and a thickness of 50 mm to perform an operation of melting 30 kg of metal Si having a B concentration of 8 ppm, then raising it in temperature to 1550° C., charging 5 kg of $SiO_2$ and 10 kg of $K_2CO_3$ as the slag material, then discharging the result after 10 minutes 20 times was run for the case of not adding anything except for the slag material (comparative method) and the case of adding 300 g of particles having the same ingredient included in the reaction vessel and an average particle size of 1 mm each time at the same time as charging the slag material (method of the present invention). The results are shown in Table 2. When not adding anything other than the slag material, the wear at the inside wall of the reaction vessel near the interface of the slag and molten Si becomes the worst. Compared with a maximum 25 mm reduction in thickness, when adding the above substance, this was reduced to 4 mm. Further, the concentrations of B in the molten Si after refining were 0.1 ppm or less in both cases.

TABLE 2

|  | Maximum wear depth (mm) | B concentration (ppm) |
|---|---|---|
| Comparative example method | 25 | <0.1 |
| Invention example method | 4 | <0.1 |

Example 3 and Comparative Example 3

An experiment using an $Al_2O_3$ reaction vessel containing 10 mass % MgO having an inside diameter of 250 mm and a thickness of 50 mm to perform an operation of melting 30 kg of metal Si having a B concentration of 8 ppm, then raising it in temperature to 1550° C., charging 5 kg of $SiO_2$ and 10 kg of $Na_2CO_3$ as the slag material, then discharging the result after 10 minutes 20 times was run for the case of not adding anything except for the slag material (comparative method) and the case of adding 300 g of fibrous $Al_2O_3$ containing 10 mass % $SiO_2$ having a diameter of 0.1 mm and a length of 100 mm and 50 g of MgO particles having an average particle size of 1 mm each time at the same time as charging the slag material (method of the present invention). The results are shown in Table 3. When not adding anything other than the slag material, the wear at the inside wall of the reaction vessel near the interface of the slag and molten Si becomes the worst.

Compared with a maximum 20 mm reduction in thickness, when adding the above substance, this was reduced to 2 mm. Further, the concentrations of B in the molten Si after refining were 0.1 ppm or less in both cases.

TABLE 3

| | Maximum wear depth (mm) | B concentration (ppm) |
|---|---|---|
| Comparative example method | 20 | <0.1 |
| Invention example method | 2 | <0.1 |

The invention claimed is:

1. A method of refining Si using $SiO_2$ and an alkali oxide or alkali carbonate as a slag material and adding it into molten Si in a reaction vessel so as to form slag and move impurities in said molten Si to the slag, said method of refining Si characterized by adding at least one type of ingredient included in the reaction vessel used into said slag.

2. A method of refining Si as set forth in claim 1, characterized by adding an ingredient the same as the ingredient included in said reaction vessel into said slag.

3. A method of refining Si as set forth in claim 1, characterized in that the ingredient of said reaction vessel is at least one type of ingredient selected from $Al_2O_3$, MgO, CaO, and $ZrO_2$.

4. A method of refining Si as set forth in claim 1, characterized in that the ingredient added to said slag is a silicate including at least $SiO_2$ in 5 mass %.

5. A method of refining Si as set forth in claim 1, characterized in that the amount of ingredient added to said slag is 0.1 to 20 mass % with respect to the slag material.

6. A method of refining Si as set forth in claim 1, characterized in that the ingredient added to said slag is shaped as granules or fibers.

7. A method of refining Si as set forth in claim 6, characterized in that said granular ingredient has a particle size of 0.01 to 10 mm.

8. A method of refining Si as set forth in claim 6, characterized in that said fiber ingredient has a diameter of 0.01 to 10 mm and a fiber length of 10 to 500 mm.

* * * * *

UNITED STATES PATENT AND TRADEMARK OFFICE
CERTIFICATE OF CORRECTION

PATENT NO. : 7,662,356 B2  Page 1 of 1
APPLICATION NO. : 11/883280
DATED : February 16, 2010
INVENTOR(S) : Shinji Tokimaru et al.

It is certified that error appears in the above-identified patent and that said Letters Patent is hereby corrected as shown below:

On the Title Page under Item (75) Inventors, Third Inventor name, change "Jirou Kondou" to -- Jiro Kondo --;

Column 6, line 18, change "0.01" to -- 0.01mm --;

Column 6, line 20, change "0.01" to -- 0.01mm --; and

Column 6, line 21, change "10" to -- 10mm --.

Signed and Sealed this

Twentieth Day of April, 2010

David J. Kappos
*Director of the United States Patent and Trademark Office*